Patented Apr. 22, 1941

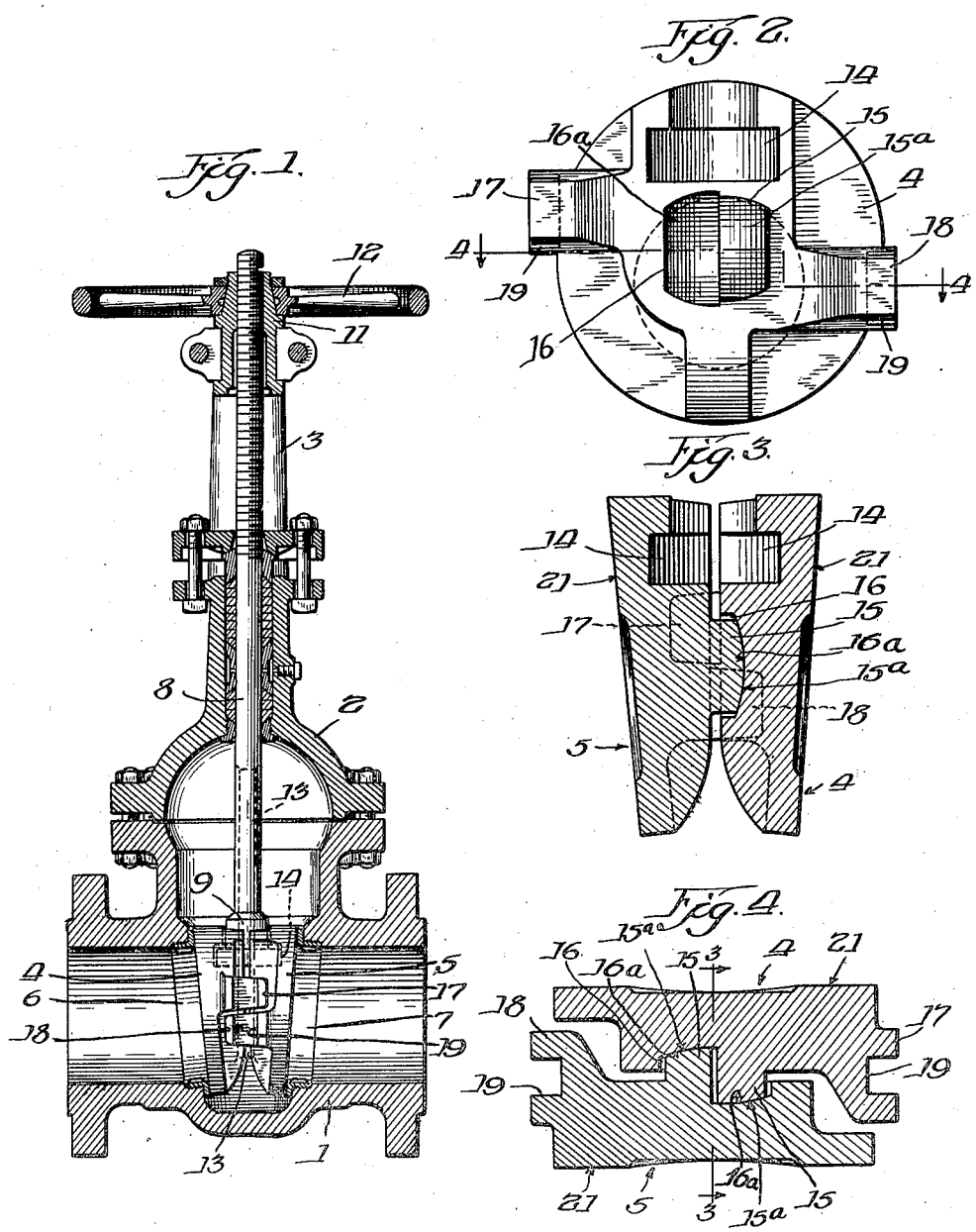

2,239,271

UNITED STATES PATENT OFFICE 2,239,271

VALVE

Charles A. Olson, Geneva, Ill., assignor to Crane Co., Chicago, Ill., a corporation of Illinois Application December 8, 1938, Serial No. 244,531

2 Claims. (Cl. 251—59)

This invention relates to gate valves and more particularly to gate valves having the pivotable type of split wedge discs.

An object of the invention is to provide for the simple and economical use of a single pattern for the two-piece wedge closure member normally required for a split-wedge type of gate for the valve and employing a simple interlocking construction requiring little or no machining on the inwardly cooperating surfaces.

Another important object of the invention is to provide an improved guiding means on each half of the closure member.

A further important object of the invention is to provide identical interlocking halves of a wedge gate valve closure member that attach to the valve stem in such a manner that each is moved by the stem directly and independently of the other and in which each accomplishes an equal amount of wedging against the other disc half by the unique arrangement employed.

Still another object of the invention is to provide spherical contact surfaces on each half of the disc which are centrally located to allow for universal adjustment of the discs to the casing seating surfaces and which adjustability is limited only by the disc guiding means provided by the body of the valve.

It is also an object of the invention to provide double wedge discs in which, after remachining of the seating surfaces, the innermost faces of the discs may be built up by spraying with metal in order that they will again accurately fit the valve body.

Other objects and advantages of the invention will be more readily understood by reference to the accompanying drawing, in which Fig. 1 is a side sectional assembly view of a valve in which the discs comprising the invention are shown in the seated position.

Fig. 2 is an elevation of the valve disc showing the innermost face thereof.

Fig. 3 is a vertical sectional view taken on the line 3—3 of Fig. 4.

Fig. 4 is a sectional view taken on the line 4—4 of Fig. 2 and showing the manner in which the innermost faces of the discs cooperate.

Similar reference characters refer to similar parts throughout the various views.

Referring to Fig. 1, the gate valve shown therein comprises the usual body or casing 1, the bonnet 2, and the yoke 3 mounted upon the bonnet. The foregoing named parts are shown in their particular form merely for purposes of illustration as it is contemplated that the forms of these parts may be varied considerably according to the size of the valve and the service for which it is to be adapted. Furthermore, the particular forms of these parts are not included within the scope of this invention. The closure member which comprises the discs 4 and 5 is shown in the closed position with the said discs wedged tightly between the non-parallel body seat rings 6 and 7, respectively, and is loosely attached to the valve stem 8 at the T-head 9 on the lower end of the stem. The upper portion of the stem is screw-threadedly journaled within the yoke sleeve 11 which latter member is non-rotatably attached to the handwheel 12, whereby rotational movement of the handwheel will cause axial movement of the stem and of the closure member attached thereto. Vertical guide ribs 13 are provided in the casing 1 on opposite walls transverse to the run of the valve and project inwardly toward the center of the valve to cooperate with the closure member to guide it to and from the seats and also to keep it from turning.

Referring now to Fig. 2, the discs 4 are shown as being slightly elliptical in shape, each having in its upper portion a semi-cylindrically formed socket 14 for reception of the stem T-head 9. Centrally arranged on the disc, each on one side of and adjacent to the vertical axis of the disc, are the projection 15 having a convex spherically curved outermost surface 15a and the recess 16 having a concave spherically curved innermost surface 16a. Extending forwardly and outwardly from opposite sides of the disc are the hook members 17 and 18, respectively, disposed preferably slightly above and below the horizontal axis of the disc.

Referring to Figs. 3 and 4, the cooperation between the irregular innermost faces can readily be seen. The sockets 14 cooperate to form a substantial enclosure for the stem T-head 9. The projection 15 of each disc extends into the recess 16 of the opposite disc, with the spherical conformed surface 15a contacting with the concave surface 16a in meshing engagement. As more clearly shown in Fig. 4, the hook members 17 and 18 are in vertical alignment respectively with the hook members 18 and 17 of the opposite disc. Thus when the discs are assembled in the valve the meshed spherical surfaces 15a and 16a, respectively, upon the projection 15 and within the recess 16 allow universal movement of the discs limited only by the guide ribs 13 which project into the channels 19 in the respective hooks 17 and 18.

With these discs, which form my invention, installed in a valve as shown in Fig. 1, vertically upward movement of the stem 8 will cause each disc to be lifted independently of the other disc by the stem which has its T-head 9 engaged by each of the sockets 14 in the discs. Conversely, vertically downward movement of the stem from a raised or open position will cause each disc to be lowered individually to its respective seat whereupon each disc will be equally wedged between its seat and the inner face 15a of the opposite disc, thus forming a fluid tight closure for the valve. In the event that the machined face 21 of either disc should become damaged by abuse or wear and thus allow fluid leakage past the closure member when it is in the closed position, the face 21 may be readily remachined to restore a flat contact surface thereto. In order to replace the metal machined from the face 21, an equal thickness of metal may be applied to the opposite or inwardly positioned face by a metal spray or the like accumulation without impairing the co-operation between the complementary portions of the inward faces. It will be apparent that the central spherical positioning of the projection 15 within the recess 16 provides a freely pivotable ball and socket contact surface on each disc and enhances the probability of the closure member forming a fluid tight stoppage of the line served by the valve because of the even distribution of force applied against the seats 6 and 7 by the discs.

Obviously, changes may be made in the construction and arrangement of my valve gate without departing from the real spirit and purpose of my invention, and it is my intention to cover by my claims any modifications which may be reasonably included within their scope.

I claim:

1. In a valve, a closure member of the wedge gate type, a reciprocating stem therefor having a connecting head, seats for the said closure member, vertically extending guide ribs for the said closure member within the said casing, the said closure member comprising two cooperating discs of identical shape and size, each of the said discs having a socket adapted to receive a portion of the said stem head, each of the said discs having a convexly spherical projection, the outermost convex surface of the said projection being located immediately adjacent the vertical centerline of the said discs, each of the said discs having a concavely spherical recessed portion, the innermost concave surface of the said recessed portion being located immediately adjacent the said projection on the opposite side of the vertical centerline, each of the said discs having a plurality of transversely projecting guide hooks comprising channeled members adapted to slidingly engage the said guide ribs upon a plurality of surfaces thereof, one of the said guide hooks being positioned on one side of the said disc above the horizontal centerline thereof, the other of said guide hooks being positioned on the opposite side of the said disc below the horizontal centerline thereof, whereby each of the said discs is independently guided to and from its respective seat, and whereby the respective centrally located interengaged projections and recesses allow limited universal movement between the said discs and provide substantially evenly distributed wedging action between the said discs and the said seats irrespective of the direction of line flow through the valve.

2. In a valve, a closure member of the wedge gate type, a reciprocating stem therefor having a connecting head, seats for the said closure member, vertically extending guide ribs for the said closure member within the said casing, the said closure member comprising two identical cooperating discs, each of the said discs having a socket adapted to receive a portion of the said stem head, each of the said discs having a projection the outermost surface of which is convexly spherical and located immediately adjacent the vertical centerline of the said discs, each of the said discs having a recessed portion the innermost surface of which is concavely spherical and is located immediately adjacent the said projection on the opposite side of the vertical centerline, each of the said discs having offset grooved transversely projecting guide portions adapted for cooperable sliding engagement with the said guide ribs and upon opposed surfaces thereof, one of the said latter guide portions being positioned on one side of the said disc above the horizontal centerline thereof, the second guide portion being positioned on the opposite side of the said disc below the horizontal centerline thereof, each of the said guide portions straddling the vertical centerline of the assembled discs, whereby the centrally located interengaged projections and recesses allow universal movement between the said discs, the said guide portions serving to determine the extent of the universal movement between the said discs while being maintained substantially equidistant from the said seats irrespective of the direction of line flow through the valve.

CHARLES A. OLSON.